Dec. 13, 1938.    J. C. KIDWELL ET AL    2,140,081
MULTIPIECE BRAKE SHOE
Filed Oct. 1, 1937
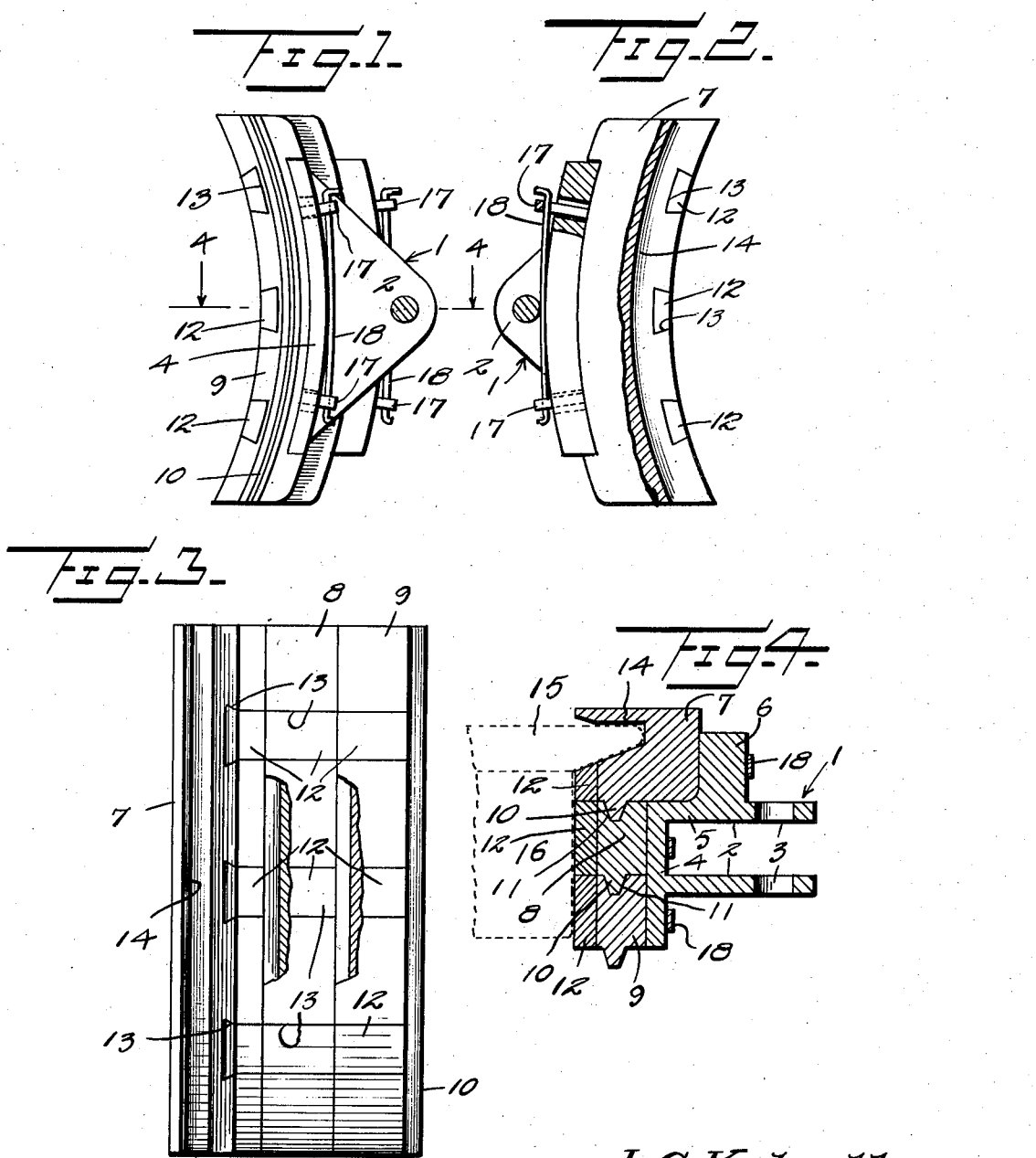
J.C.Kidwell
R.A.Poland
INVENTORS
BY Victor J. Evans & Co.
ATTORNEY Patented Dec. 13, 1938

2,140,081

UNITED STATES PATENT OFFICE 2,140,081

MULTIPIECE BRAKE SHOE

John C. Kidwell, Fairmont, and Richard A. Poland, Morgantown, W. Va.

Application October 1, 1937, Serial No. 166,896

2 Claims. (Cl. 188—240)

This invention relates to multiple part brake shoes for locomotives and other railroad rolling stock, and has for the primary object the provision of a device of this character which will materially reduce maintenance cost to both the tires of wheels and the brake shoes and will bring about more even wear of the tires, thereby reducing to a minimum the forming of high faces on the treads of the tire by some portions of the tread receiving more wear than other portions and consequently increasing the length of time and use of a tire before it is necessary to turn down the tread of the tire to remove high portions.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a side elevation illustrating a brake shoe constructed in accordance with my invention.

Figure 2 is a vertical sectional view illustrating the same.

Figure 3 is a front elevation, partly in section, showing the brake shoe.

Figure 4 is a sectional view taken on the line 4—4 of Figure 1.

Referring in detail to the drawing, the numeral 1 indicates a bracket forming a part of the present invention and employed for detachably securing the latter onto a brake rigging (not shown) of a conventional construction. The bracket 1 consists of spaced plates 2 apertured, as shown at 3, and integral therewith are portions 4, 5, and 6. The portion 6 is offset from the portion 4 and the portion 5 extends at right angles to the portions 4 and 6. The portions 4, 5 and 6 cooperate in forming a seat for shoe elements 7, 8 and 9. The shoe elements 7, 8 and 9 are connected by tenons 10 fitting in grooves 11. Facing strips 12 are removably secured to the shoe elements by tenons 13 fitting in dovetail shaped grooves. The facing strips 12 are constructed of a material having abrasive therein. The shoe elements 8 and 9 are similarly constructed and the shoe element 7 is shaped to fit the portions 5 and 6 of the bracket and is provided with a flange receiving groove 14 engageable with a car wheel flange 15. The facing strip 12 of the brake shoe element 7 only contacts a very limited portion of the flange 15 of the wheel. The tread of the wheel is indicated by the character 16 and the facing strips 12 engage therewith during the application of the brake shoe to the car wheel.

Staple-like elements 17 are formed on the shoe elements 7, 8 and 9 and pass through slots formed in the bracket. Flexible keys 18 engage with the bracket and pass through the staples for retaining the shoe elements on the bracket. The keys are tensioned when applied to the bracket and the staples.

The construction described will permit any one of the shoe elements and its facing strip to be removed and replaced by another when wear has become excessive thereon, consequently eliminating the necessity of discarding the entire shoe for cause of wear, thereby materially reducing maintenance cost of the shoe.

In use, the tread 16 of the wheel always receives more wear than the flange 15 due to its continuous contact with the railroad rail besides having braking force applied thereto. This excessive wear will bring about high places on the wheel, especially the flange, will become out of proportion to the tread face and to prevent the necessity of cutting the wheel flange down the section 7 can be removed and replaced by an unworn section of a corresponding shape so that when braking action is applied to the wheel more wear will be placed on the flange than on the tread portion 16 and thereby wear down the flange. This also will apply to the tread face 7 when high portions form therein by irregular wear and the brake shoe element which would come in engagement with the high portion of the tread 16 will be replaced by an unworn section of a corresponding shape so that during braking action the high portion of the tread will be worn away restoring the tread of the wheel to approximately a true circle. By employing brake shoes of this kind the car wheels can be kept in continuous use for a longer period of time before it is necessary to subject the wheels to a truing or turning down operation. By reducing to a minimum the high portions or faces of the wheel materially reduces the possibility of accidents and excessive wear from vibration on the rolling stock.

Having described the invention, we claim:

1. A brake shoe comprising a bracket including a seat and relatively spaced portions apertured to receive a fastener for securing the bracket on a brake rigging, brake shoe elements engageable with said seat, a pair of said shoe elements shaped to conform to the tread and the other of said shoe elements shaped to conform to the flange of a car wheel, said first defined shoe elements having grooves, projections formed on all of said elements and the projections on said last defined element and one of the first defined elements received in said grooves, and means for detachably connecting the elements on said bracket.

2. A brake shoe comprising a bracket including a seat and relatively spaced portions apertured to receive a fastener for securing the bracket on a brake rigging, brake shoe elements engageable with said seat, a pair of said shoe elements shaped to conform to the tread and the other of said shoe elements shaped to conform to the flange of a car wheel, said first defined shoe elements having grooves, projections formed on all of said elements and the projections on said last defined element and one of the first defined elements received in said grooves, staples formed on said elements, said bracket having slots for the staples to extend through, and flexible keys passing through the staples and engaging the bracket to releasably secure the brake shoe elements on the bracket.

JOHN C. KIDWELL.
RICHARD A. POLAND.